(12) United States Patent
Sano et al.

(10) Patent No.: US 7,522,156 B2
(45) Date of Patent: Apr. 21, 2009

(54) OPTICAL SCANNING-TYPE TOUCH PANEL

(75) Inventors: Satoshi Sano, Kawasaki (JP); Yasuhide Iwamoto, Kawasaki (JP); Fumihiko Nakazawa, Kawasaki (JP); Nobuyasu Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1277 days.

(21) Appl. No.: 09/875,084

(22) Filed: Jun. 7, 2001

(65) Prior Publication Data

US 2001/0055006 A1    Dec. 27, 2001

Related U.S. Application Data

(63) Continuation of application No. PCT/JP99/06809, filed on Dec. 3, 1999.

(30) Foreign Application Priority Data

Feb. 24, 1999   (JP)   ............................. 11-047233

(51) Int. Cl.
   *G06F 3/042*  (2006.01)
(52) U.S. Cl. .................. 345/175; 345/173; 359/196
(58) Field of Classification Search .......... 345/173, 345/175, 177, 207; 359/196; 178/18.01, 178/18.03
   See application file for complete search history.

(56) References Cited

U.S. PATENT DOCUMENTS

| | | | |
|---|---|---|---|
| 4,558,313 A | | 12/1985 | Garwin et al. |
| 4,762,990 A | * | 8/1988 | Caswell et al. ............... 250/221 |
| 4,820,050 A | | 4/1989 | Griffin |
| 5,438,446 A | * | 8/1995 | Brandt ........................ 359/196 |
| 5,525,764 A | | 6/1996 | Junkins et al. |
| 6,104,522 A | * | 8/2000 | Hayashi et al. ............. 359/207 |
| 6,421,042 B1 | * | 7/2002 | Omura et al. ................ 345/157 |
| 6,563,491 B1 | * | 5/2003 | Omura ........................ 345/173 |

FOREIGN PATENT DOCUMENTS

| | | |
|---|---|---|
| EP | 0 897 161 A1 | 2/1999 |
| JP | 62-5428 | 1/1987 |

(Continued)

OTHER PUBLICATIONS

Japanese Office Action dated Jun. 6, 2006.

(Continued)

*Primary Examiner*—Richard Hjerpe
*Assistant Examiner*—Kimnhung Nguyen
(74) *Attorney, Agent, or Firm*—Westerman, Hattori, Daniels & Adrian, LLP.

(57) ABSTRACT

Laser light emitted by a light emitting element is made parallel light by a collimation lens, passes through an aperture of an aperture mirror, and is then angularly scanned in a plane substantially parallel to a display screen by rotation of a polygon mirror and projected onto a recurrence reflection sheet. Then, after the reflected light from the recurrence reflection sheet is reflected by the polygon mirror and aperture mirror, the light is focused by a condenser lens to enter a light receiving element. The aperture mirror has an asymmetrical shape in the scanning direction and/or the vertical direction about the optical axis, according to a scanning surface opening width of the polygon mirror.

7 Claims, 21 Drawing Sheets

FOREIGN PATENT DOCUMENTS

| | | |
|---|---|---|
| JP | 62-99823 | 5/1987 |
| JP | 63-275906 | 11/1988 |
| JP | 64-18823 | 1/1989 |
| JP | 05-266623 | 10/1993 |
| JP | 09-284483 | 10/1997 |
| JP | 11-30710 | 2/1999 |
| JP | 11-110116 | 4/1999 |

OTHER PUBLICATIONS

Satoshi Sano, et al., "Size Detecting Touch Input Panel Suitable for Large Screens", IEICE. MVE98-85 (Dec. 1998).

Japanese Office Action dated May 29, 2007, Application No. 11-047233.

* cited by examiner

A: SCANNING LIGHT
B: REFLECTED LIGHT

OPTICAL SCANNING-TYPE TOUCH PANEL

This application is a continuation of international application PCT/JP99/06809 filed Dec. 3, 1999.

TECHNICAL FIELD

The present invention relates to an optical scanning-type touch panel for optically detecting the position of an indicator on a display screen.

BACKGROUND ART

With the spread of computer systems, mainly personal computers, there has been used a device for inputting new information or giving various instructions to a computer system by pointing at a position on a display screen of a display device on which information is displayed by the computer system, with a person's finger or a specific indicator.

In order to perform an input operation with respect to the information displayed on the display screen of the display device of a personal computer or the like by a touching method, it is necessary to detect a touched position (indicated position) on the display screen with high accuracy. As one example of such a method of detecting the indicated position on the display screen serving as a coordinate surface, Japanese Patent Application Laid-Open No. 62-5428/1987 discloses an optical position detecting method. In this method, a light retro-reflector is positioned on a frame on both sides of the display screen, return light of an angularly scanned laser beam from the light retro-reflector is detected, an angle of a position where a finger or pen exists is calculated from a timing that the light beam is cut off by the finger or pen, and the coordinate of the position is detected from the calculated angle according to the triangulation principle. In this method, the accuracy of detection can be maintained with a small number of parts, and the position of the finger, arbitrary pen or the like is also detectable.

An optical scanning-type touch panel for performing such a position detection by scanning light is constructed by a retro-reflector which is generally positioned on the outside of the display screen, a light emitting element for emitting light such as laser light, an optical scanning unit such as a polygon mirror for angularly scanning the emitted light, a deflecting element for deflecting the reflected light of the scanning light from the retro-reflector, and a light receiving element for receiving the deflected reflected light so that the light from the light emitting element is scanned by the optical scanning unit, the reflected light of the scanning light from the retro-reflector is reflected again by the optical scanning unit, and the resultant reflected light is received by the light receiving element through the deflecting element. When an indicator, such as a pen and arbitrary pen, is present on the path of the scanning light, the light reflected by the retro-reflector is not received by the light receiving element. It is therefore possible to detect the position of such an indicator based on the scanning angle of the optical scanning unit and the light receiving result at the light receiving element.

In such an optical scanning-type touch panel, in general, the larger the incident angle on the retro-reflector becomes, the lower the efficiency of retro-reflection becomes, and the longer the distance from the optical scanning unit to the retro-reflector becomes, the lower the luminance becomes because the reflected light from the retro-reflector is wider due to the diffraction effect of the beam. Hence, in the case where the display region has a rectangular shape, since the diagonal section is the farthest point for scanning light and has a large incident angle, the level of the light receiving signal becomes lower at the diagonal section. As a result, the S/N ratio is impaired, causing a malfunction. In addition, it is also important to take some measures against disturbing light that impairs the S/N ratio.

The present invention was invented in view of such circumstances, and an object of the present invention is to provide an optical scanning-type touch panel capable of achieving a high S/N ratio by increasing the level of the light receiving signal and thereby accurately detecting the position of the indicator.

DISCLOSURE OF THE INVENTION

An optical scanning-type touch panel of the first invention comprising: an optical scanning unit for angularly scanning light in a plane substantially parallel to a predetermined region; a deflecting unit for deflecting scanning light of the optical scanning unit; and a light receiving unit for receiving the deflected scanning light, for detecting a scanning light cut-off position, which is produced in the predetermined region by an indicator, based on a light receiving output of the light receiving unit that corresponds to a scanning angle, wherein the deflecting unit has an asymmetrical shape about an optical axis. In the optical scanning-type touch panel of the first invention, the deflecting unit is formed in an asymmetrical shape about the optical axis so as to enlarge the effective light receiving area for the scanning light and improve the light receiving signal level.

In an optical scanning-type touch panel of the second invention according to the first invention, the shape of the deflecting unit is asymmetrical in the scanning direction. In the optical scanning-type touch panel of the second invention, the shape of the deflecting unit is made asymmetrical in the scanning direction so as to enlarge the effective light receiving area for the scanning light and improve the light receiving signal level.

In an optical scanning-type touch panel of the third invention according to the first invention, the shape of the deflecting unit is asymmetrical in the height direction. In the optical scanning-type touch panel of the third invention, the shape of the deflecting unit is made asymmetrical in the height direction so as to enlarge the effective light receiving area for the scanning light and improve the light receiving signal level.

In an optical scanning-type touch panel of the fourth invention according to the third invention, the height of the deflecting unit is substantially equal to the height of the optical scanning unit. In the optical scanning-type touch panel of the fourth invention, the height of the deflecting unit is made substantially equal to the height of the optical scanning unit so as to eliminate an unnecessary light receiving surface from the deflecting unit and prevent reception of disturbing light.

In an optical scanning-type touch panel of the fifth invention according to the fourth invention, the predetermined region has a rectangular shape, and the width of the deflecting unit is substantially equal to a scanning surface opening width of the optical scanning unit in scanning a diagonal section of the predetermined region with light. In the optical scanning-type touch panel of the fifth invention, the width of the deflecting unit is made substantially equal to the scanning surface opening width of the optical scanning unit in scanning the diagonal section of the predetermined region with light so as to eliminate an unnecessary light receiving surface from the deflecting unit and prevent reception of disturbing light.

An optical scanning-type touch panel of the sixth invention comprising: an optical scanning unit for angularly scanning light in a plane substantially parallel to a predetermined region; a deflecting unit for deflecting scanning light of the optical scanning unit; and a light receiving unit for receiving the deflected scanning light, for detecting a scanning light cut-off position, which is produced in the predetermined region by an indicator, based on a light receiving output of the light receiving unit that corresponds to a scanning angle, wherein the optical scanning-type touch panel satisfies a condition $$d/2 + w < D \tan \delta$$

where D is a distance from the optical scanning unit to the deflecting unit, w is a width on the deflecting unit from a path of the scanning light to an end on the predetermined region side, d is a beam width of the scanning light, and δ is a scanning start angle.

In the optical scanning-type touch panel of the sixth invention, it is possible to certainly scan light within the predetermined region by satisfying the relationship as described above.

An optical scanning-type touch panel of the seventh invention comprising: a light retro-reflector provided outside of a predetermined region; an optical scanning unit for angularly scanning light in a plane substantially parallel to the predetermined region; and a light receiving unit for receiving reflected light of scanning light of the optical scanning unit from the light retro-reflector, for detecting a scanning light cut-off position, which is produced in the predetermined region by an indicator, based on a light receiving output of the light receiving unit that corresponds to a scanning angle, wherein the optical scanning unit is provided with a protective film having a maximum reflectance at an angle of incidence corresponding to a scanning angle at which the quantity of the reflected light is minimum. In the optical scanning-type touch panel of the seventh invention, the optical scanning unit is provided with the protective film having the maximum reflectance at an angle of incidence corresponding to a scanning angle at which the quantity of the reflected light is minimum so as to improve the light receiving signal level in scanning the position at which the quantity of the reflected light is minimum with light.

BEST MODE FOR IMPLEMENTING THE INVENTION

Figure 1:
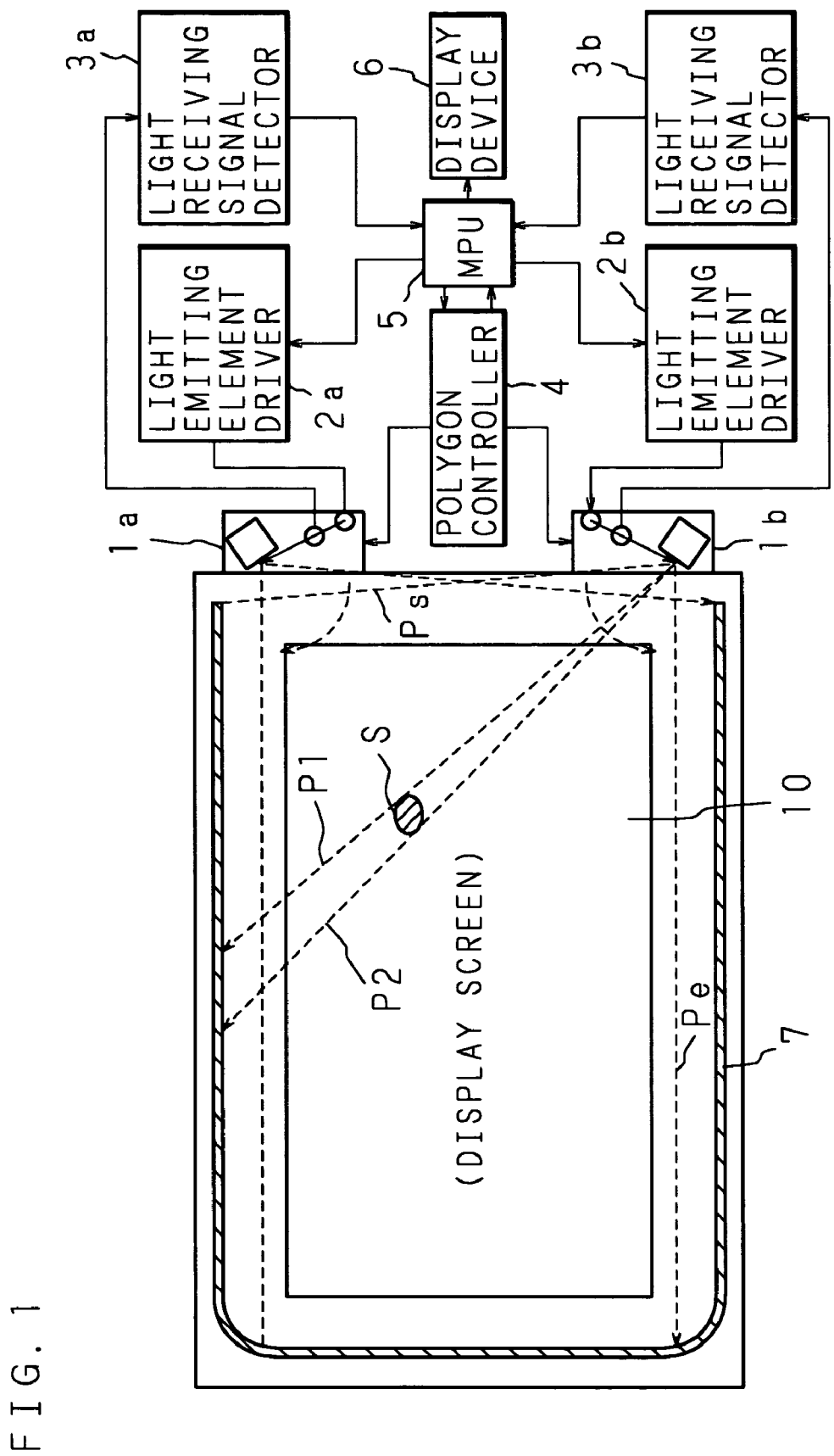
FIG. 1 is a schematic diagram showing the basic structure of an optical scanning-type touch panel of the present invention.

The following description will explain the present invention in detail with reference to the drawings illustrating an embodiment thereof. FIG. 1 is a schematic diagram showing the basic structure of an optical scanning-type touch panel of the present invention.

In FIG. 1, reference numeral 10 is a rectangular display screen of a CRT, flat display panel (PDP, LCD, EL, etc.) or projection-type image display device of electronic equipment such as a personal computer, and the optical scanning-type touch panel is constructed as the display screen of a PDP (Plasma Display Panel) in this embodiment.

Optical units 1a and 1b having therein an optical system composed of a light emitting element, a light receiving element, a polygon mirror and various lenses are respectively provided on the outside of both corners of one short side (the right side in this embodiment) of this rectangular display screen 10 that is the extent of a plane specified as a target area to be touched by an indicator S such as a finger and pen. Moreover, a recurrence reflection sheet 7 as a retro-reflector is provided on the outside of three sides other than the right side of the display screen 10, namely, the upper, lower and left sides.

Figure 2:
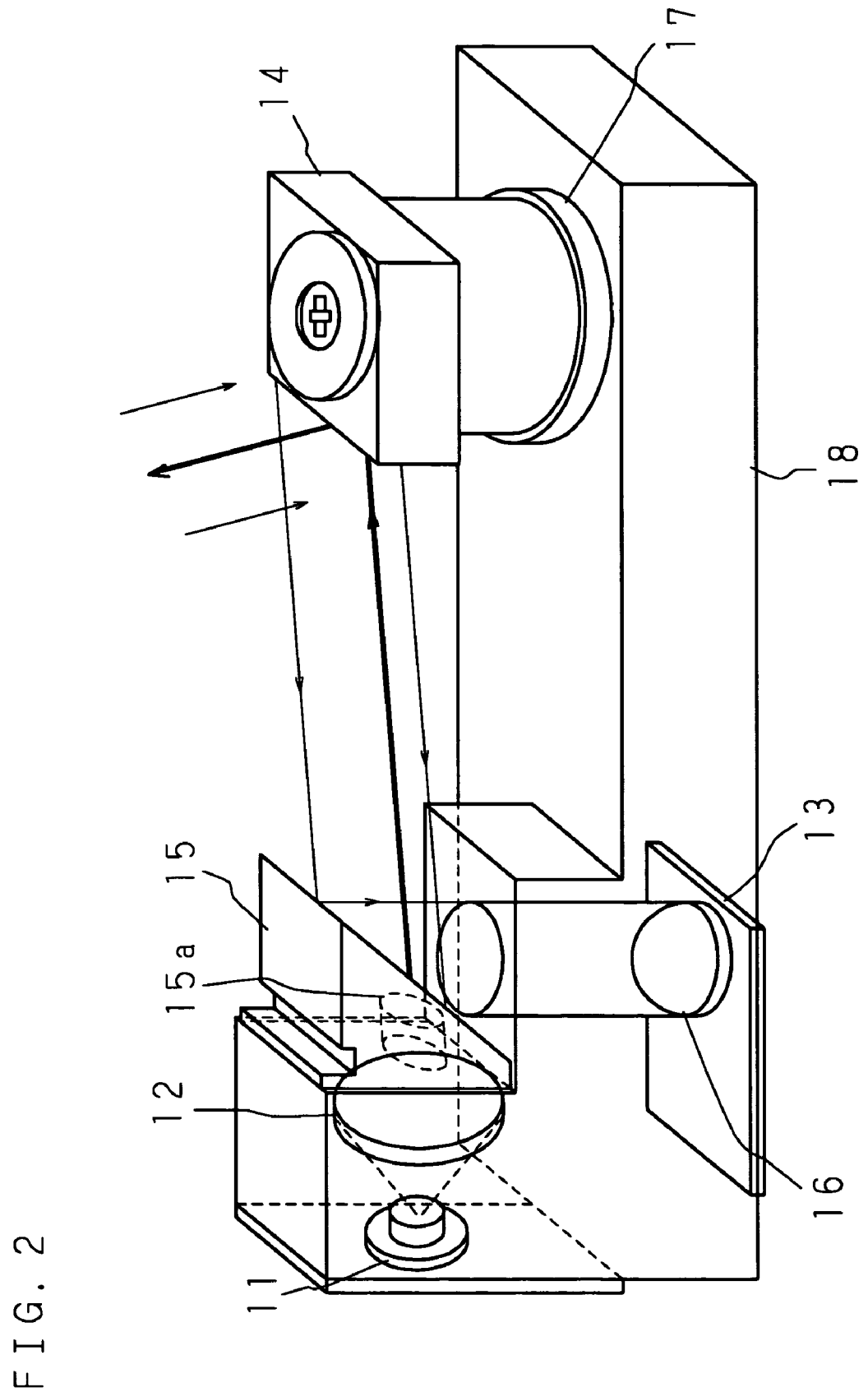
FIG. 2 is a perspective view showing the structure of an optical unit and optical path.

FIG. 2 is a perspective view showing the structure of the optical units 1a, 1b and the optical path. Both of the optical units 1a and 1b have the same internal structure. The optical unit 1a (1b) includes a light emitting element 11 composed of a laser diode (LD) for emitting infrared laser light (wavelength: 780 nm); a collimation lens 12 for changing the laser light from the light emitting element 11 into parallel light; a light receiving element 13 composed of a photodiode (PD) for receiving reflected light from the recurrence reflection sheet 7; a polygon mirror 14 having the shape of a square column, for example, for angularly scanning the laser light from the light emitting element 11; an aperture mirror 15 as a deflecting unit for limiting light to be projected onto the polygon mirror 14 from the collimation lens 12 by an aperture 15a and for reflecting light reflected from the recurrence reflection sheet 7 through the polygon mirror 14 toward the light receiving element 13; a condenser lens 16 for focusing the reflected light from the aperture mirror 15 onto the light receiving element 13; a motor 17 for rotating the polygon mirror 14; and an optical unit main body 18 on which these members are mounted and fixed.

The laser light emitted by the light emitting element 11 is made parallel light by the collimation lens 12, passes through the aperture 15a of the aperture mirror 15, and is then angularly scanned in a plane substantially parallel with the display screen 10 by rotation of the polygon mirror 14 and projected onto the recurrence reflection sheet 7. After the reflected light from the recurrence reflection sheet 7 is reflected by the polygon mirror 14 and aperture mirror 15, the reflected light is focused by the condenser lens 16 to enter the light receiving element 13. However, if the indicator S is present on the optical path of the scanning light, the scanning light is cut off, and therefore the reflected light does not enter the light receiving element 13.

The optical units 1a and 1b are connected with light emitting element drivers 2a and 2b for driving the respective light emitting elements 11, light receiving signal detectors 3a and 3b for converting the quantity of light received by the respective light receiving elements 13 into electric signals, and a polygon controller 4 for controlling the operation of the respective polygon mirrors 14. Moreover, reference numeral 5 represents an MPU for calculating the position and size of the indicator S and for controlling the operation of the entire apparatus, and 6 represents a display device for displaying the results of calculations performed by the MPU 5.

The MPU 5 transmits drive control signals to the light emitting element drivers 2a and 2b, so that the light emitting element drivers 2a and 2b are driven according to the drive control signals and the light emitting operations of the respective light emitting elements 11 are controlled. The light receiving signal detectors 3a and 3b transmit the light receiving signals of the reflected light of the respective light receiving elements 13 to the MPU 5. The MPU 5 calculates the position and size of the indicator S based on the light receiving signals from the respective light receiving elements 13, and displays the results of the calculations on the display device 6. Here, the display device 6 may also serve as the display screen 10.

In such an optical scanning-type touch panel of the present invention, if the explanation is given with respect to the optical unit 1b, for example, as shown in FIG. 1, the projected light from the optical unit 1b is scanned in a counterclockwise direction in FIG. 1 from a position where the projected light is reflected by the aperture mirror 15 and directly enters the light receiving element 13 to a position (Ps) where the projected light is reflected by an end of the recurrence reflection sheet 7, that is, a scanning start position. Then, the projected light is reflected by the recurrence reflection sheet 7 until it comes to a position (P1) where the projected light reaches one end of the indicator S, but the projected light is cut off by the indicator S up to a position (P2) where it reaches the other end of the indicator S, and then the projected light is reflected by the recurrence reflection sheet 7 until it comes to a scanning end position (Pe).

In such scanning of light, a detected light signal given when the projected light from the light emitting element 11 directly enters the light receiving element 13 from the polygon mirror 14 through the aperture mirror 15 without reaching the recurrence reflection sheet 7 is used as a reference signal. Moreover, a detected light signal given when the scanning light reaches the end (PS in FIG. 1) of the recurrence reflection sheet 7 and is reflected therefrom serves as a scanning start signal, and then a recurrence reflection signal is obtained when the reflected light from the recurrence reflection sheet 7 enters the light receiving element 13. Besides, the scanning angle is measured upon the detection of this reference signal.

Figure 3:
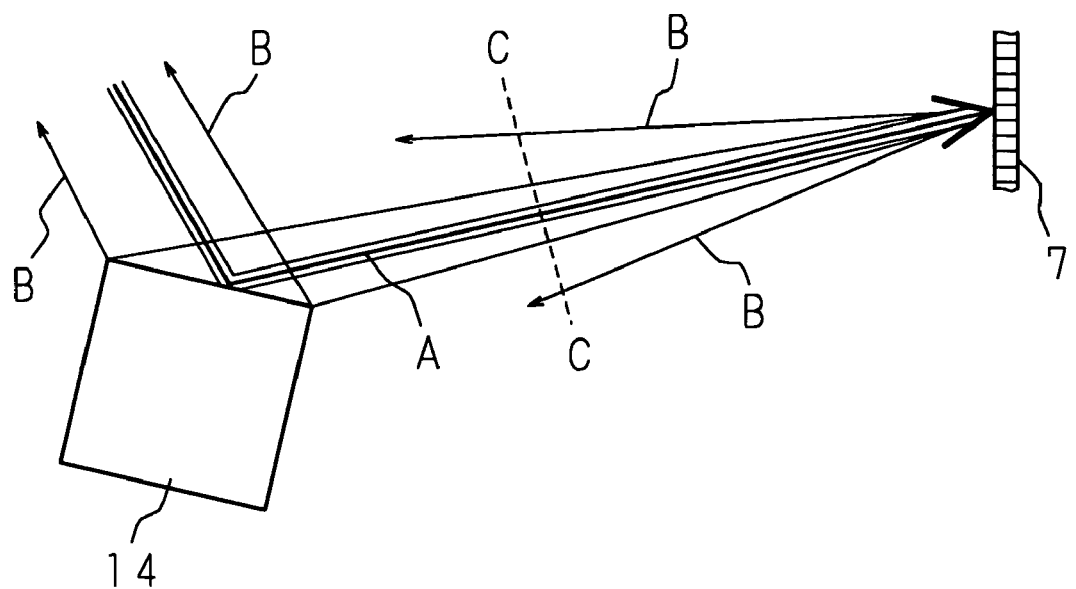
FIG. 3 is a plan view showing the relationship between the scanning light and reflected light in the optical scanning-type touch panel.

FIG. 3 is a plan view schematically showing the relationship between the scanning light and the reflected light from the recurrence reflection sheet 7 on the optical scanning-type touch panel. The light emitted by the light emitting element 11 and made parallel by the collimation lens 12 is scanned by the polygon mirror 14 through the aperture 15a of the aperture mirror 15. This scanning light A is reflected by the recurrence reflection sheet 7, and the resultant reflected light B is reflected by the polygon mirror 14 again, reflected by the light receiving surface of the aperture mirror 15 and guided to the condenser lens 16.

Figure 4:
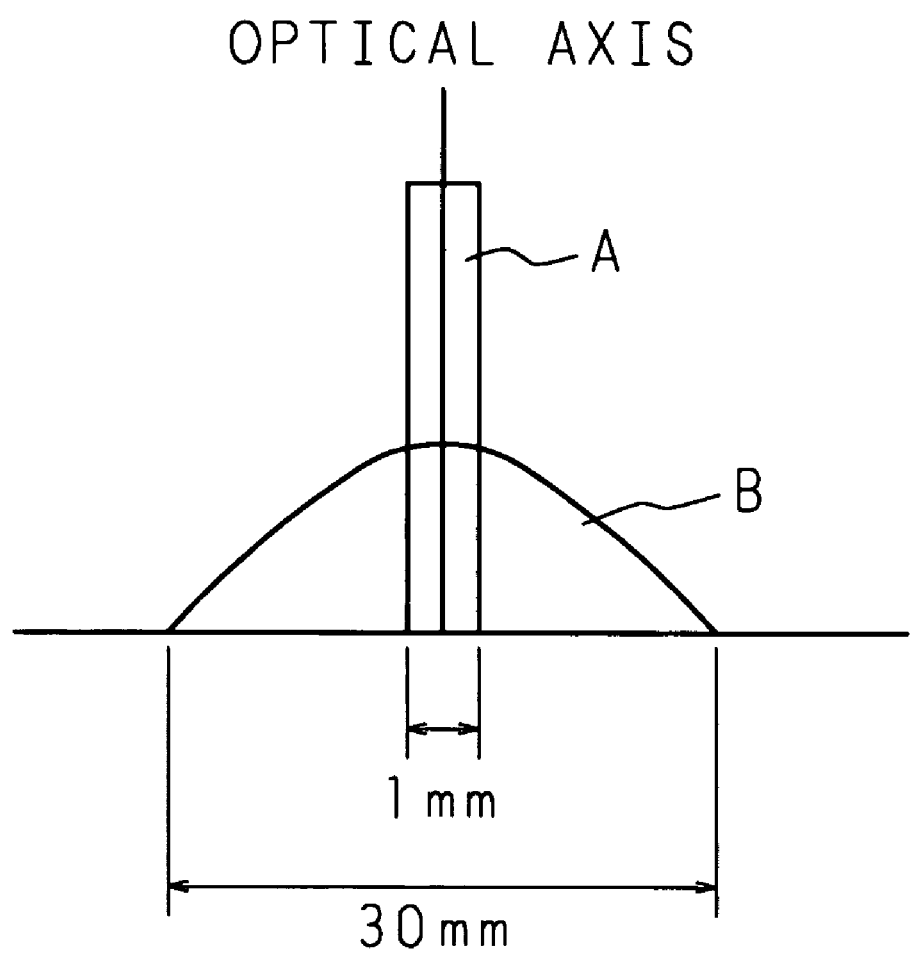
FIG. 4 is an illustration showing profiles of the scanning light and reflected light cut along the C--C line of FIG. 3.

At this time, the reflected light B becomes wider in comparison with the scanning light A. FIG. 4 is an illustration showing the profiles of the scanning light A and reflected light B cut along the C-C line in the scanning region of FIG. 3. In comparison with the scanning light A having a diameter of around 1 mm with the optical axis at its center, the reflected light B has a larger diameter of around 30 mm with the optical axis at its center.

Therefore, when a noise level is specified, an increase of the light receiving area, that is, the effective light receiving area of the aperture mirror 15, contributes to an improvement of the S/N ratio. However, it is not preferable to increase the aperture mirror 15 boundlessly, and the aperture mirror 15 should be fabricated in a small size in view of an improvement of the degree of freedom of the mount design. For this reason, it is necessary to design the polygon mirror 14 and aperture mirror 15 in optimum sizes. In particular, the effective light receiving area of the polygon mirror 14 varies according to a scanning angle in scanning. Moreover, since the light receiving signal level in scanning the farthest point within the scanning region determines the lowest level, it is desirable to design the aperture mirror 15 and polygon mirror 14 so that a cross-sectional area of the polygon mirror 14 seen from the aperture mirror 15 and a cross-sectional area of the aperture mirror 15 seen from an optical axis direction in scanning the farthest point are identical with each other, and it is possible to construct an optimum scanning light receiving system in such a design.

Figure 5:
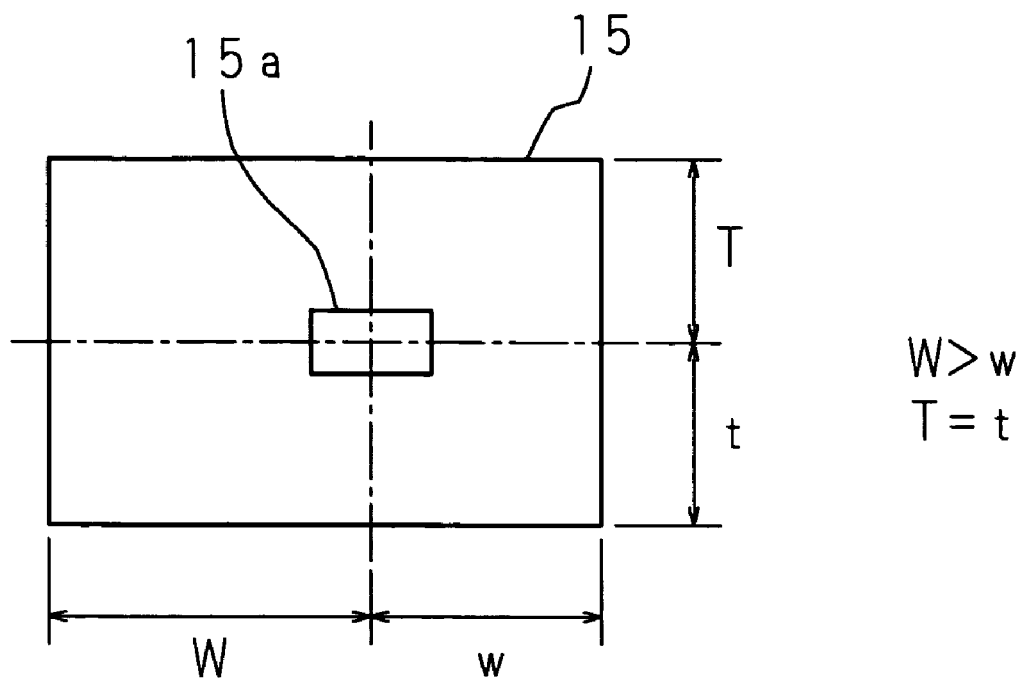
FIG. 5 is a front view of an aperture mirror.

FIG. 5 is a front view of the aperture mirror 15 of the present invention designed by considering the above-mentioned aspects. The shape of the aperture mirror 15 is asymmetrical in a scanning direction (the right-and-left direction) about the optical axis. By forming the aperture mirror 15 in such an asymmetrical shape, the effective light receiving area can be increased, and consequently the S/N ratio is improved. In particular, when the mounting space is taken into consideration, the asymmetry in the scanning direction can effectively improve the light receiving efficiency by securing a large light receiving area on the scanning start side.

Figure 6:
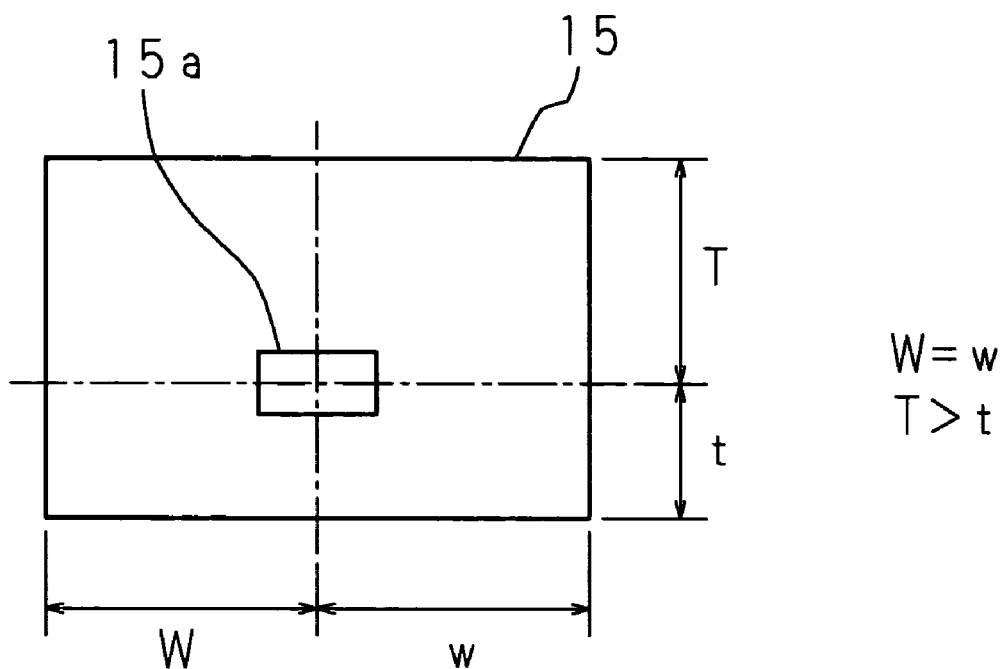
FIG. 6 is a front view of an aperture mirror.
Figure 7:
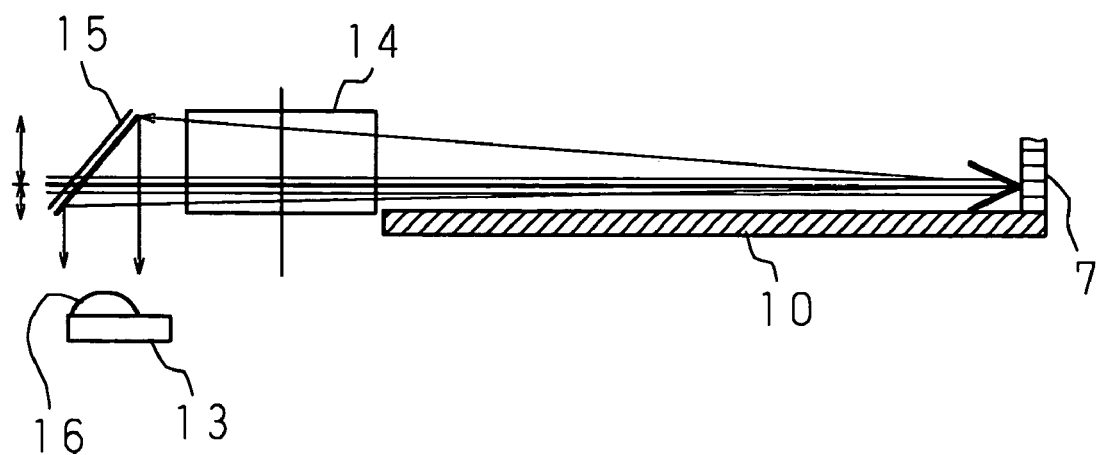
FIG. 7 is a schematic diagram of a scanning light receiving system using the aperture mirror of FIG. 6.

By the way, since the display screen 10 is located below the path of the scanning light, even when the lower side of the light receiving surface of the aperture mirror 15 is enlarged, it does not contribute to an improvement of the light receiving efficiency. It is therefore preferable to secure a large light receiving area on the side higher than the scanning surface of the polygon mirror 14 by designing the shape of the aperture mirror 15 asymmetrical in the vertical direction about the optical axis. FIG. 6 is a front view of the aperture mirror 15 designed accordingly, and FIG. 7 is a schematic diagram of a scanning light receiving system of the present invention using such an aperture mirror 15.

This structure secures the aperture mirror 15 with a light receiving surface height as high as the height of the light receiving surface of the polygon mirror 14, and it is meaningless to make the aperture mirror 15 larger than this level because even if the aperture mirror 15 is made larger than this level, only a region which does not contribute to the reception of light increases. By designing the aperture mirror 15 to have such a structure, it is possible to improve the light receiving efficiency in comparison with a structure having a light receiving surface symmetrical in the vertical direction, without changing the scanning surface height.

Figure 8:
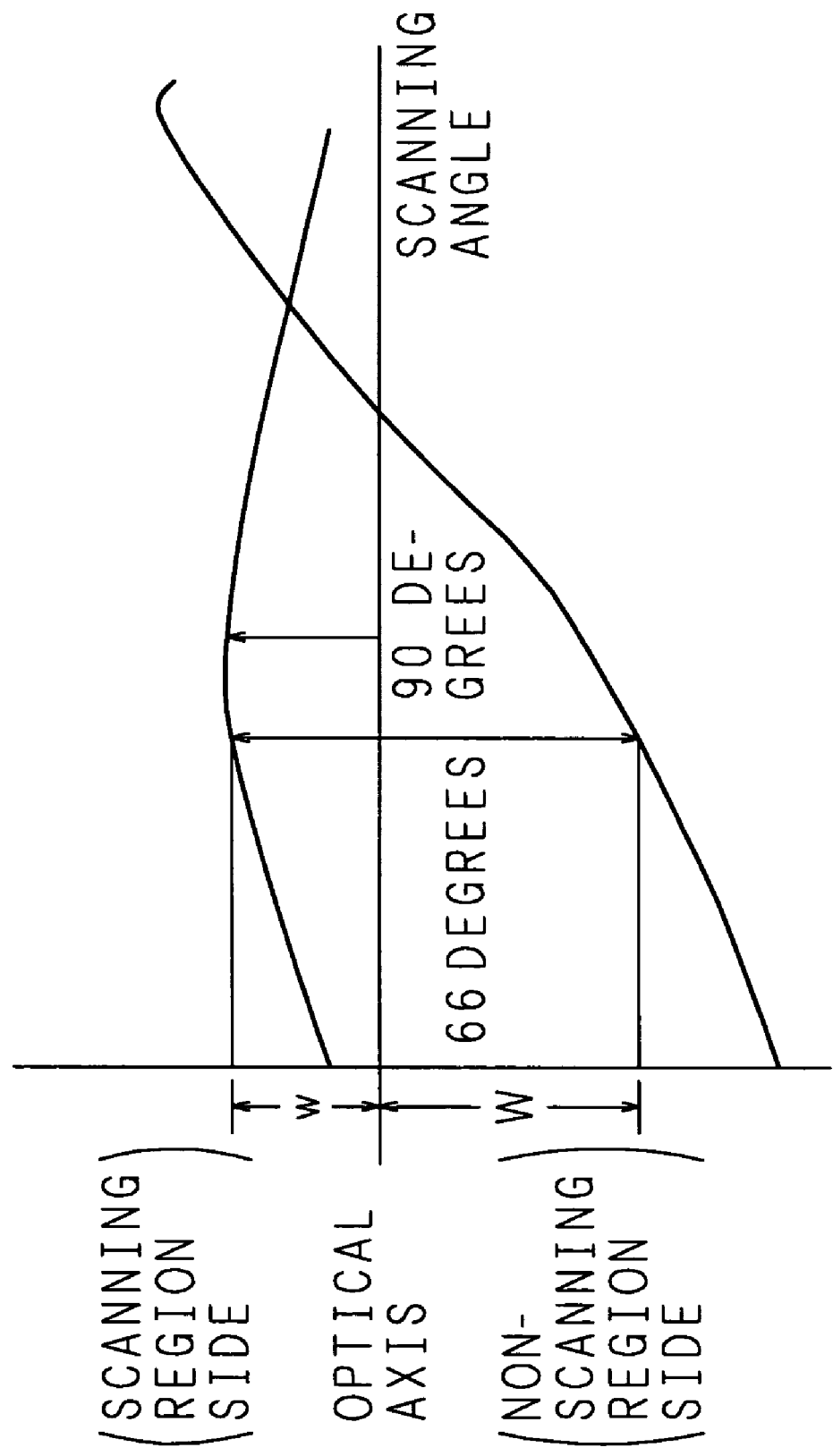
FIG. 8 is a graph showing the relationship between the scanning angle and the light receiving scanning surface opening width.

FIG. 8 is a graph showing the relationship between the scanning angle and the light receiving scanning surface opening width. Since the beam width is finite, the light receiving surface on the scanning region side must not extend into a detection region. The S/N ratio is most lowered when scanning the diagonal section (when the scanning angle is 66 degrees) at which the quantity of the reflected light is minimum, and, therefore, in the present invention, in order to secure a light receiving scanning surface opening width (w+W) for this scanning, the width of the aperture mirror 15 is specified to this light receiving scanning surface opening width (w+W). Moreover, in the present invention, the polygon mirror 14 is set at a mountable maximum height, and the height of the aperture mirror 15 is determined in accordance with the height of the polygon mirror 14.

Figure 9:
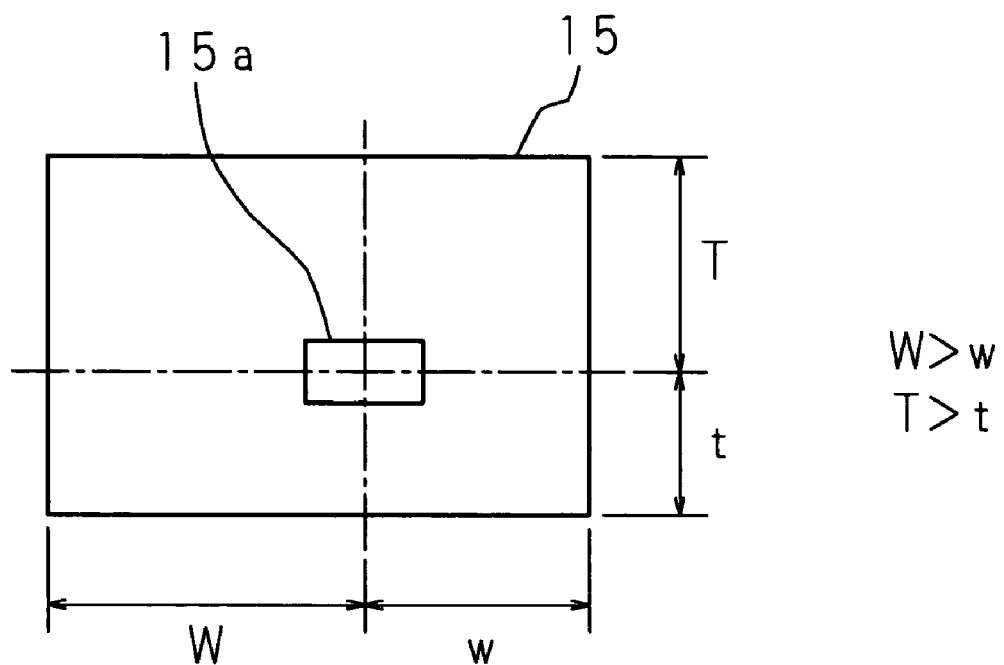
FIG. 9 is a front view of an aperture mirror.
Figure 10:
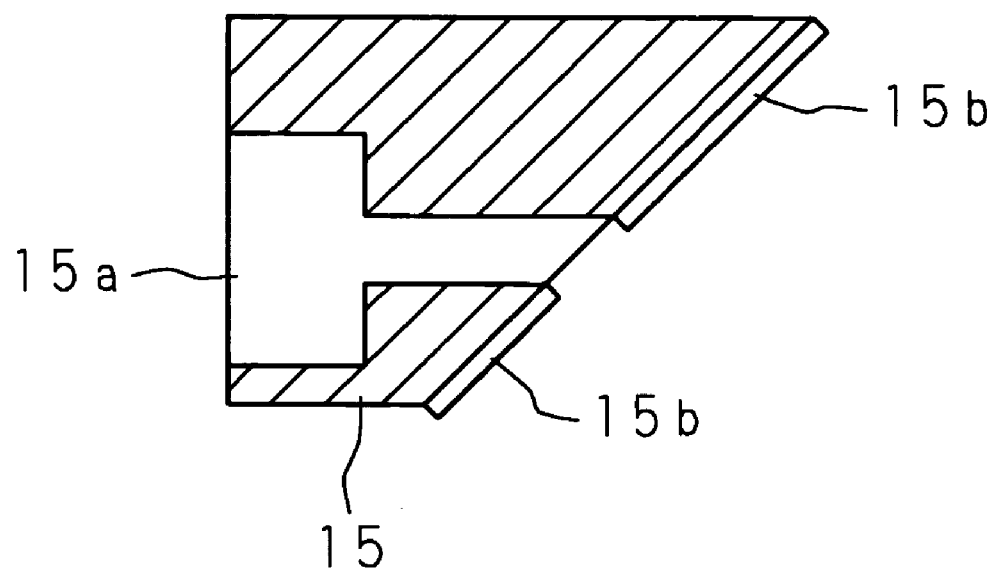
FIG. 10 is a side sectional view of the aperture mirror.

FIG. 9 and FIG. 10 are the front view and sectional side view of the aperture mirror 15 of the present invention. For the reason as mentioned above, the aperture mirror 15 of the present invention has an asymmetrical shape in the scanning (right-and-left) direction and the vertical direction as shown in FIG. 9.

The aperture mirror 15 is made of a metal such as aluminum, but, when its surface rusts, its reflectance characteristic deteriorates. In the present invention, therefore, a surface of the aperture mirror 15 that faces the polygon mirror 14 has a mirror finish, and the mirror-finished surface is covered with a protective film 15b made of a dielectric such as SiO and SiO$_2$ for protecting the mirror-finished surface from moisture and dust which cause rust. Besides, in this example, the angle of incidence of the reflected light from the recurrence reflection sheet 7 on the aperture mirror 15 (protective film 15b) is 45 degrees.

Figure 11:
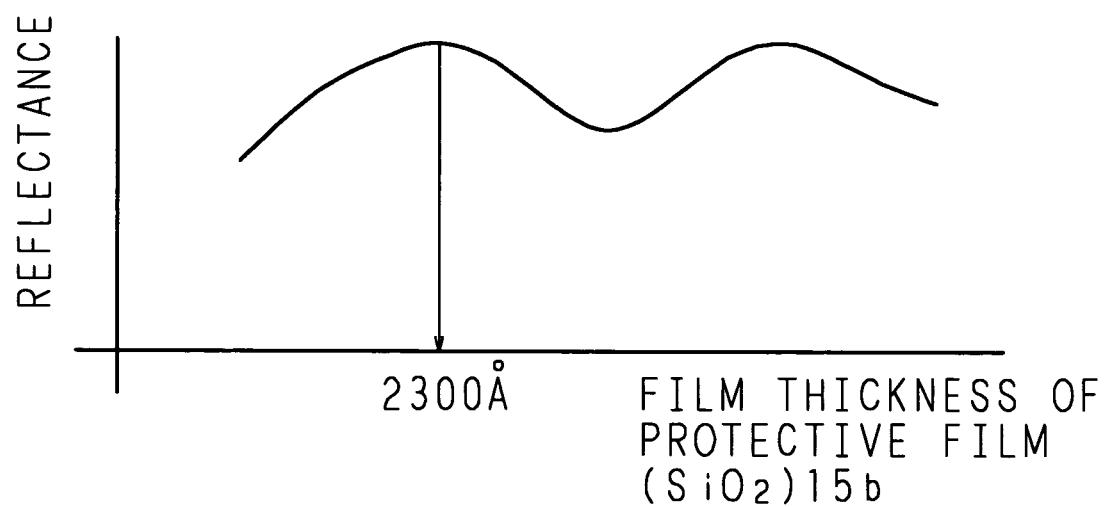
FIG. 11 is a graph showing the relationship between the film thickness of a protective film of the aperture mirror and the reflectance.

FIG. 11 is a graph showing the relationship between the film thickness of the protective film 15b made of SiO$_2$ and the reflectance when light having a wavelength of 780 nm enters the aperture mirror 15 at an angle of 45 degrees. It will be understood from FIG. 11 that the reflectance is maximum when the film thickness of the protective film 15b is 2300 Å. In the present invention, therefore, the film thickness of the protective film 15b made of SiO$_2$ is made 2300 Å so as to obtain the maximum reflectance for the laser light having a wavelength of 780 nm used for scanning, thereby improving the S/N ratio.

Figure 12:
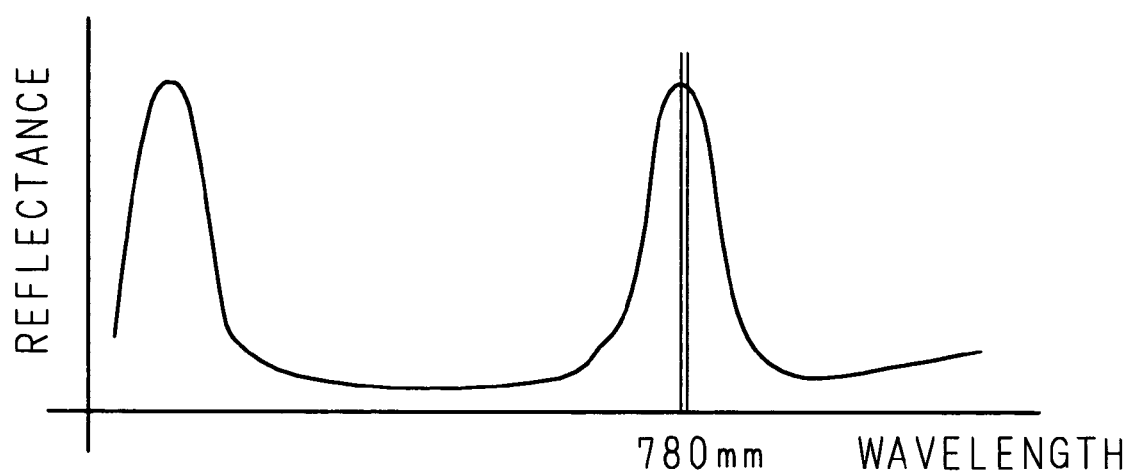
FIG. 12 is a graph showing the wave length-reflectance characteristic of an antireflection film of the aperture mirror.

Moreover, it is possible to provide on the surface of the aperture mirror 15 an antireflection film having a multi-layer film structure for preventing reflection of light other than the scanning light of a specific wavelength (780 nm). FIG. 12 is a graph showing the wavelength-reflectance characteristics of this antireflection film when the angle of incidence is 45 degrees, and this antireflection film has a characteristic of selectively reflecting light in the vicinity of 780 nm. Thus, since a high reflectance characteristic can be exhibited only for the specific angle of incidence (45 degrees) and wavelength (780 nm) of incident light by providing such an antireflection film, it is possible to guide only desired recurrence reflected light to the light receiving system and prevent reflection of disturbing light, thereby improving the S/N ratio.

Figure 13:
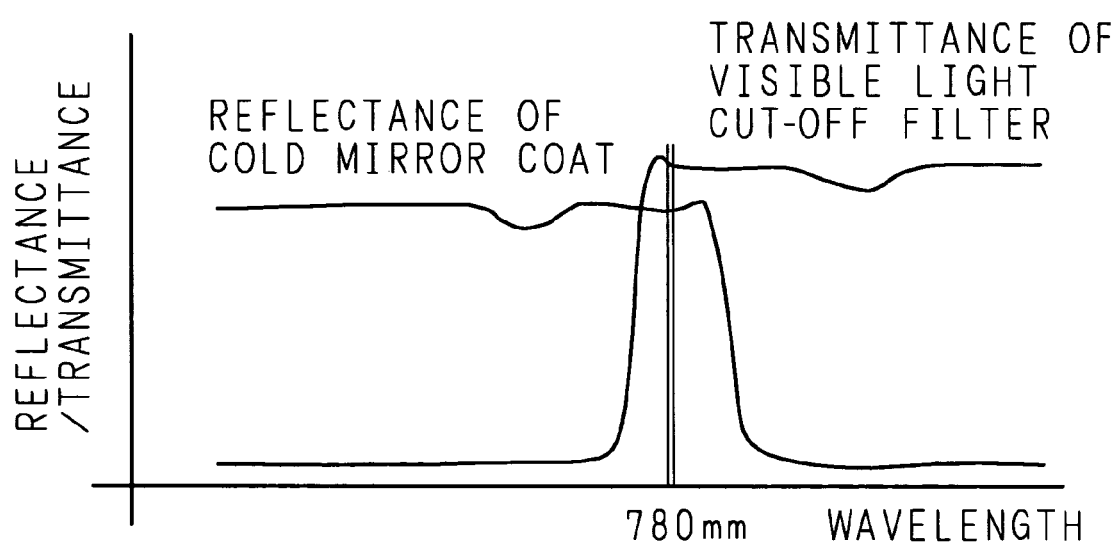
FIG. 13 is a graph showing the reflectance characteristic of a cold mirror coat and the transmittance characteristic of a visible cut-off filter.

Furthermore, by combining a cold mirror coat for efficiently removing infrared ray components and a visible light cut-off filter and appropriately using the band difference therebetween, it is possible to perform a function of selectively reflecting the recurrence reflected light of the specific wavelength (780 nm). FIG. 13 is a graph showing the reflectance characteristic of this cold mirror coat and the transmittance characteristic of this visible light cut-off filter, and it will be understood from FIG. 13 that only light in the vicinity of 780 nm can be selectively reflected. Further, it is also possible to perform a similar function by combining a hot mirror coat and an infrared light cut-off filter.

Figure 14:
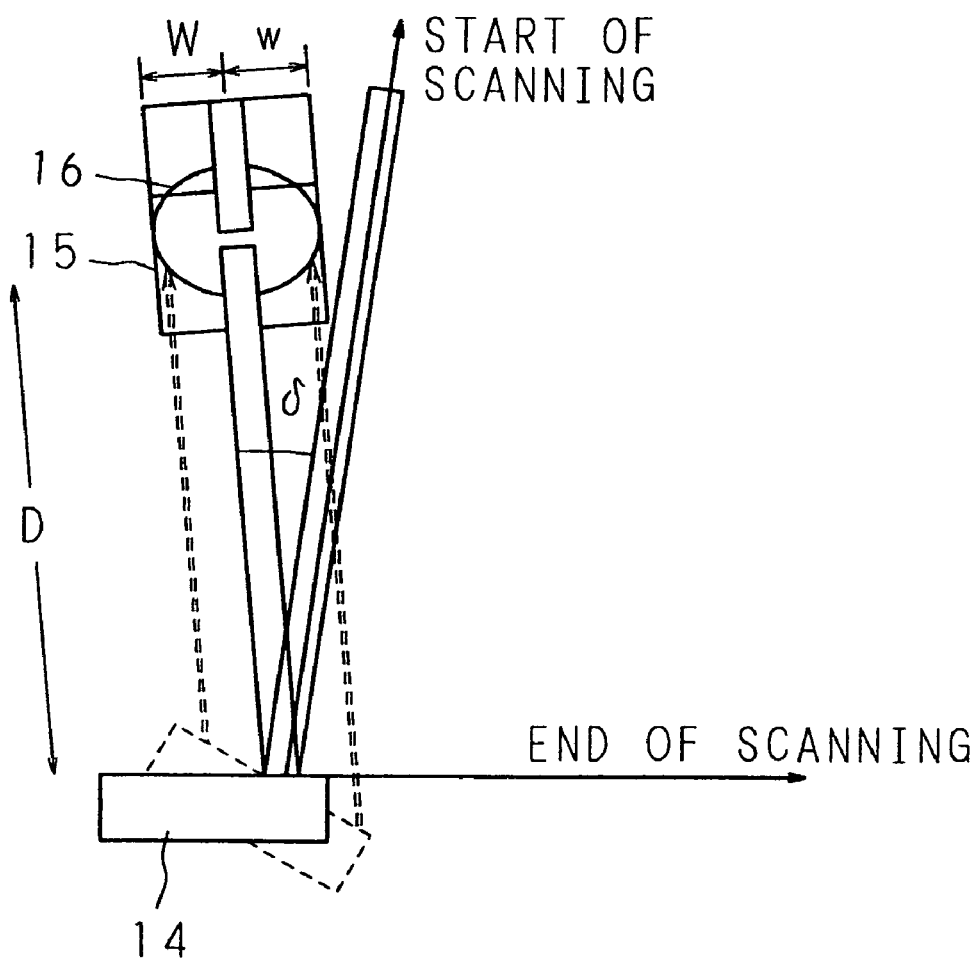
FIG. 14 is a schematic diagram showing the layout design of the optical members of an optical unit and a state of scanning light.

Next, the following description will explain an arrangement of the optical units 1a and 1b in the optical scanning-type touch panel of the present invention. FIG. 14 is a schematic diagram showing the positional design of the optical members of the optical units 1a and 1b and a state of scanning light.

In FIG. 14, δ represents a scanning start angle (the angle formed by the optical axis of parallel light from the aperture 15a and the optical path of scanning light corresponding to Ps in FIG. 1 that actually strikes the recurrence reflection sheet 7), and the scanning start angle δ is expressed by the sum of an angle α formed by a scanning reference line (the line connecting both the optical units 1a and 1b) and the optical axis of parallel light from the aperture 15a (i.e., the angle of tilting the optical unit 1a, 1b from the scanning reference line toward a non-scanning region side (non-detection region side) and an angle β formed by the scanning reference line and the optical path of the scanning light corresponding to Ps. Besides, D represents the distance from the aperture mirror 15 to the polygon mirror 14, w is a width on the aperture mirror 15 from the optical path of the scanning light to an end on the scanning region side (detection region side), and W is a width on the aperture mirror 15 from the optical path of the scanning light to an end on the non-scanning region side (non-detection region side).

Here, when the beam width of the scanning light is denoted by d, if the following condition (1) is further satisfied, it is possible to receive the reflected light of the scanning light from the recurrence reflection sheet 7 by the light receiving elements 13 without being cut-off by the optical units 1a and 1b. Hence, the positions of the respective optical members are designed to satisfy this condition (1).

$$d/2 + w < D \tan \delta \quad (1)$$

By adopting such design specifications, it is possible to eliminate unnecessary space for mounting, scan light within the scanning range and receive the reflected light, and receive only the recurrence reflected light even at the start of scanning. Further, an example of specific numerical values is, for instance, α=6 degrees, β=3 degrees, δ=9 degrees, w+W=7 mm, d=3 mm, and D=45 mm. In this case, the aperture mirror 15 may have an asymmetrical shape (w≠W) or a symmetrical shape (w=W).

By the way, as described above, in order to secure the minimum quantity of light in scanning the diagonal section (the direction of 60 degrees from the scanning reference line) within the scanning region, when the polygon mirror 14 with four faces is used, since the angle of incidence is 33 degrees (the scanning angle is 66 degrees) for a scanning start angle δ of 6 degrees, it is possible to secure an effective light receiving area of cos 33° of the face width of the polygon mirror 14. Accordingly, when the face width of the polygon mirror 14 is 11 mm, the width (w+W) of the aperture mirror 15 is given by 11×cos 33°=9.23 mm.

Figure 15:
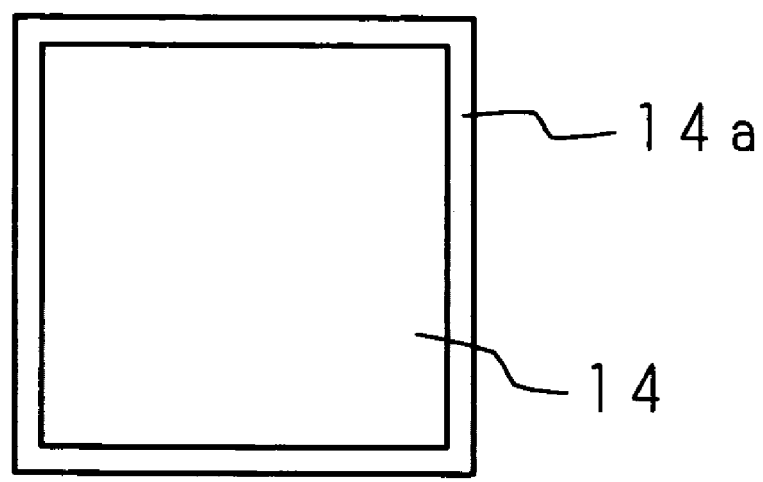
FIG. 15 is a plan view of a polygon mirror.

Like the above-described aperture mirror 15, when the surface of the polygon mirror 14 rusts, the reflectance characteristic is impaired. In the present invention, therefore, as shown in FIG. 15, the surface of the polygon mirror 14 is covered with a protective film 14a made of a dielectric such as SiO and $SiO_2$ for protecting the mirror-finished surface from moisture and dust which cause rust.

Figure 16:
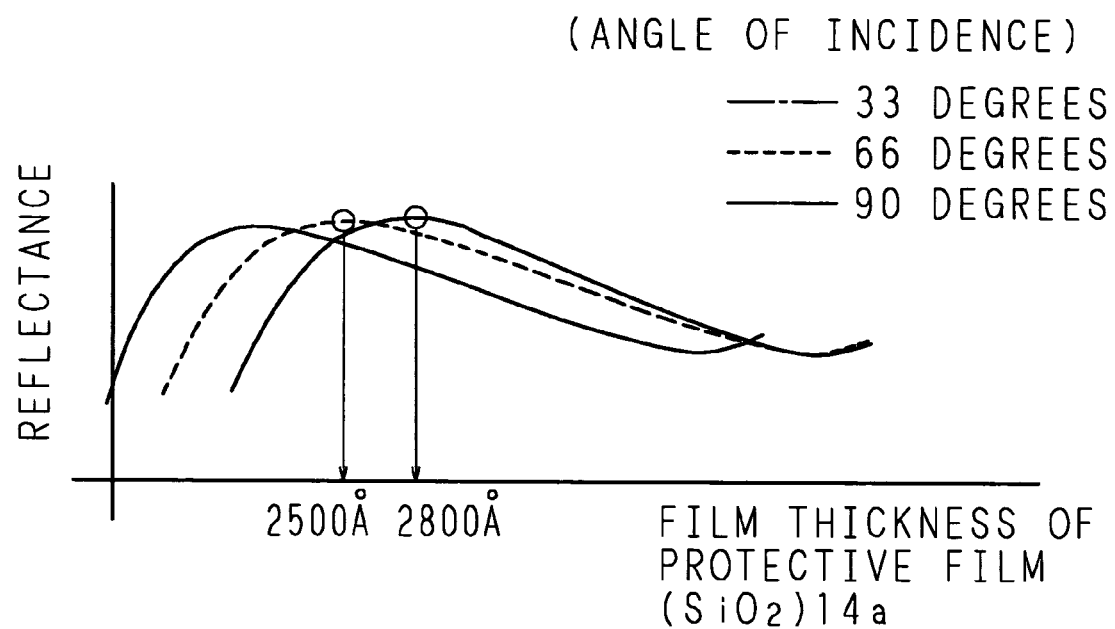
FIG. 16 is a graph showing the relationship between the film thickness of a protective film of the polygon mirror and the reflectance.

FIG. 16 is a graph showing the relationship between the film thickness of the protective film 14a and the reflectance when light having a wavelength of 780 nm enters the polygon mirror 14 having the protective film 14a made of $SiO_2$. In FIG. 16, the single-dashed line, the short dashes line and the double-dashed line indicate the characteristics when the angles of incidence are 33 degrees, 66 degrees and 90 degrees, respectively. Considering the offset angle, the angle of incidence on the polygon mirror 14 is not smaller than 45 degrees. By setting the film thickness of the protective film 14a within a range between 2500 Å that gives the maximum reflectance when the angle of incidence is 66 degrees and 2800 Å that gives the maximum reflectance when the angle of incidence is 33 degrees, it is possible to set the maximum reflectance for the angle of incidence between 33 degrees and 66 degrees.

Figure 17:
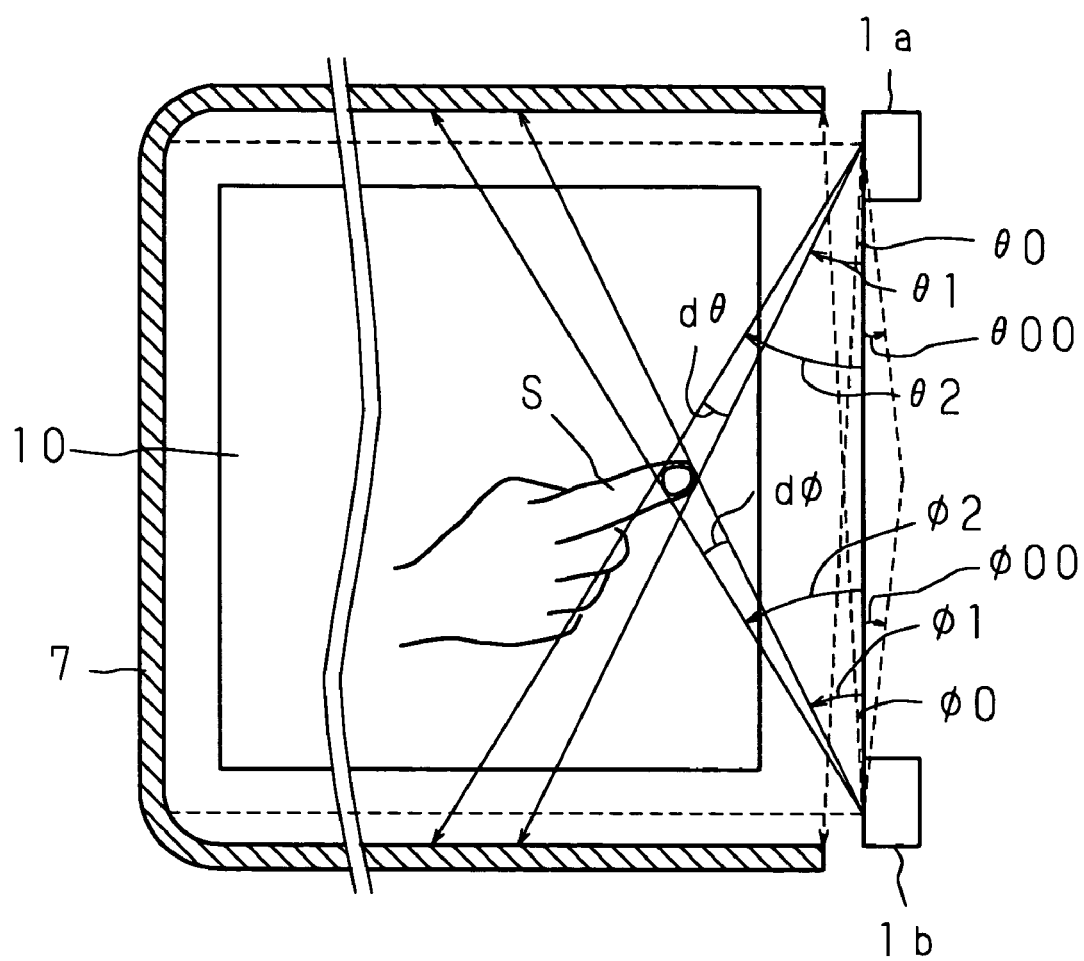
FIG. 17 is a schematic diagram showing a state of implementation of the optical scanning-type touch panel.

Next, the following description will explain an operation of calculating the position and size of the indicator S by the optical scanning-type touch panel of the present invention. FIG. 17 is a schematic diagram showing a state of implementation of the optical scanning-type touch panel. In FIG. 17, however, illustration of the constituent members other than the optical units 1a, 1b, recurrence reflection sheet 7 and display screen 10 is omitted. Incidentally, FIG. 17 shows an example in which a finger is used as the indicator S.

The MPU 5 controls the polygon controller 4 to rotate the respective polygon mirrors 14 in the optical units 1a and 1b, thereby angularly scanning the laser light from the respective light emitting elements 11. As a result, the reflected light from the recurrence reflection sheet 7 enters the respective light receiving elements 13. The quantity of the received light that entered the respective light receiving elements 13 as mentioned above is obtained as the light receiving signals which are the outputs of light receiving signal detectors 3a and 3b.

Further, in FIG. 17, θ00 and φ00 represent the angles from the scanning reference line to the respective light receiving elements, θ0 and φ0 represent the angles from the scanning reference line to the ends of the recurrence reflection sheet 7, θ1 and φ1 represent the angles from the scanning reference line to one end of the indicator S on the reference line side, and θ2 and φ2 represent the angles from the scanning reference line to another end of the indicator S on the opposite side to the reference side, respectively. Here, θ00 or φ00 correspond to the above-mentioned angle α; θ0 or φ0 correspond to the above-mentioned angle β; and (θ00+θ0) or (φ00+φ0) correspond to the above-mentioned scanning start angle δ.

Figure 18:
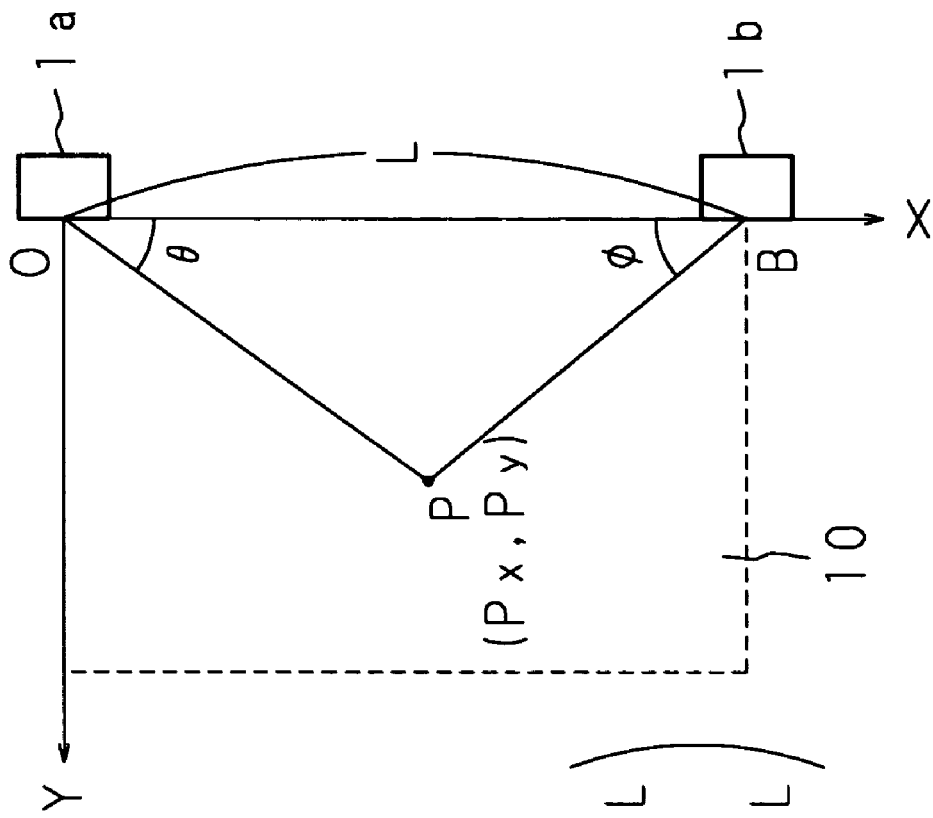
FIG. 18 is a schematic diagram showing the principle of triangulation for detecting a coordinate.

When the indicator S is present on the optical path of the scanning light on the display screen 10, the light projected from the optical units 1a and 1b and then reflected by the indicator S does not enter the respective light receiving elements 13. Therefore, in a state as shown in FIG. 17, the reflected light does not enter the light receiving element 13 in the optical unit 1a when the scanning angle is in a range between 0° and θ0, the reflected light enters that light receiving element 13 when the scanning angle is in a range between θ0 and θ1, and the reflected light does not enter that light receiving element 13 when the scanning angle is in a range between θ1 and θ2. Similarly, the reflected light does not enter the light receiving element 13 in the optical unit 1b when the scanning angle is in a range between 0° and φ0, the reflected light enters that light receiving element 13 when the scanning angle is in a range between φ0 and φ1, and the reflected light does not enter that light receiving element 13 when the scanning angle is in a range between φ1 and φ2, Next, the following description will explain a process of calculating a coordinate of a central position (indicated position) of the indicator S (a finger in this example) from the cut-off range calculated in the above-mentioned manner. First, conversion of an angle into an orthogonal coordinate based on the triangulation will be explained. As shown in FIG. 18, the position of the optical unit 1a is set as an origin O, the right side and upper side of the display screen 10 are set as the X-axis and Y-axis, and the length of the reference line (the distance between the optical units 1a and 1b) is set as L. Moreover, the position of the optical unit 1b is set as B. When a central point P (Px, Py) indicated by the indicator S on the display screen 10 is positioned at angles of θ and φ with respect to the X-axis from the optical units 1a and 1b, the values of X coordinate Px and Y coordinate Py of the point P can be calculated according to the principle of the triangulation as shown by equations (2) and (3) below, respectively.

$$Px(\theta, \phi) = (\tan \phi) \div (\tan \theta + \tan \phi) \times L \quad (2)$$

$$Py(\theta, \phi) = (\tan \theta \cdot \tan \phi) \div (\tan \theta + \tan \phi) \times L \quad (3)$$

Figure 19:
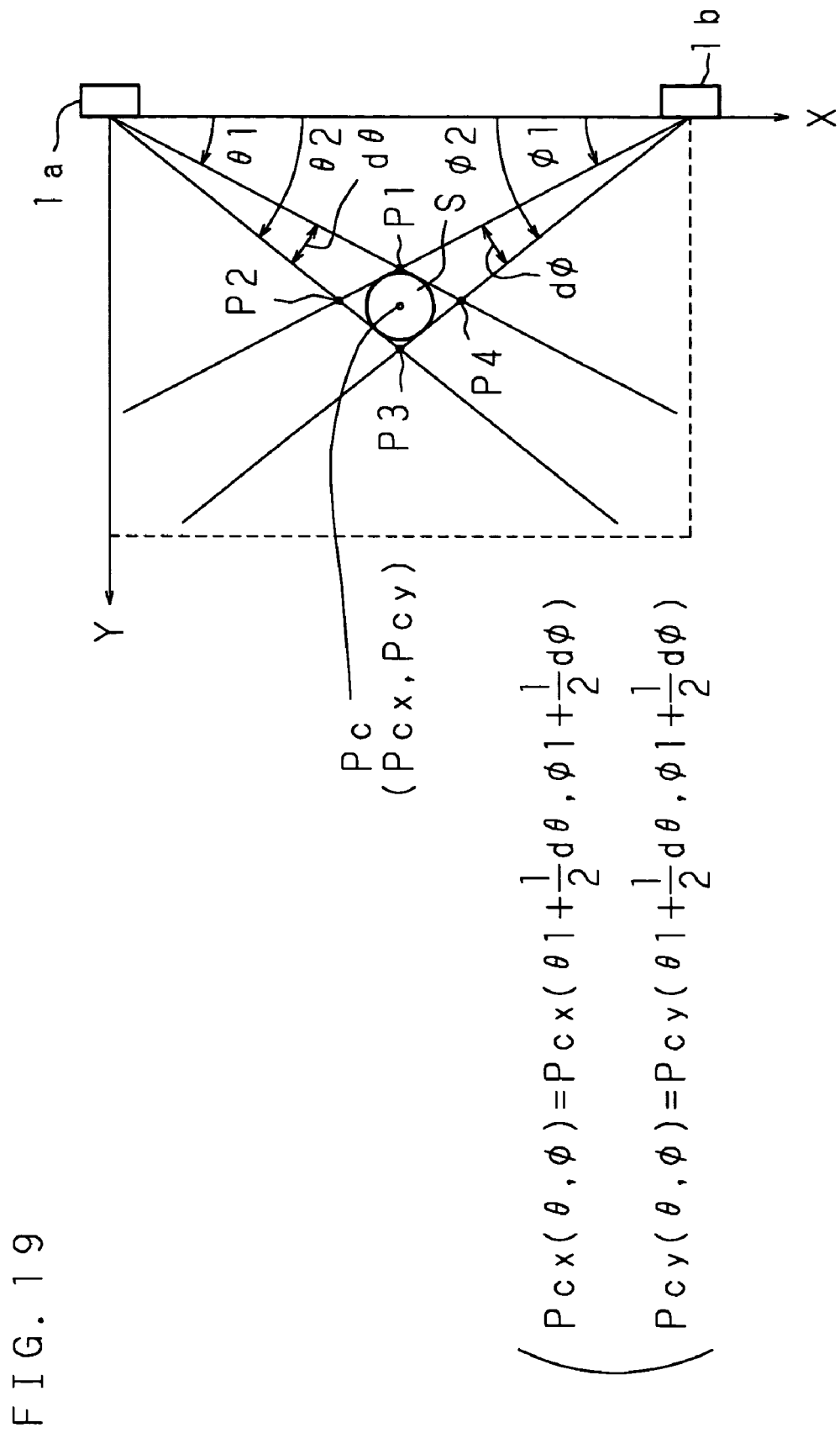
FIG. 19 is a schematic diagram showing an indicator and a cut-off range.

By the way, since the indicator S (finger) has dimensions, when the detection angle at the timing of rise/fall of the detected light receiving signal is adopted, as shown in FIG. 19, four points (P1 through P4 in FIG. 19) on the edge of the indicator S (finger) are detected. These four points are all different from the indicated central point (Pc in FIG. 19). Thus, a coordinate (Pcx, Pcy) of the central point Pc is calculated as follows. Pcx and Pcy can be expressed as shown by the following equations (4) and (5), respectively.

$$Pcx(\theta, \phi) = Pcx(\theta1 + d\theta/2, \phi1 + d\phi/2) \quad (4)$$

$$Pcy(\theta, \phi) = Pcy(\theta1 + d\theta/2, \phi1 + d\phi/2) \quad (5)$$

Then, by substituting θ1+dθ/2 and φ1+dφ/2 expressed by equations (4) and (5) for θ and φ of equations (2) and (3) above, the coordinate of the indicated central point Pc can be obtained.

In the above-mentioned example, the average value of the angle is calculated first and then substituted into the converting equations (1) and (2) of triangulation to calculate the coordinate of the central point Pc as the indicated position. However, it is also possible to calculate the coordinate of the central point Pc by first calculating the orthogonal coordinates of the four points P1 through P4 from the scanning angle according to the converting equations (2) and (3) of triangulation and then calculating the average of the calculated coordinate values of the four points. Moreover, it is also possible to determine the coordinate of the central point Pc as the indicated position by considering parallax and easy viewing of the indicated position.

Figure 20:
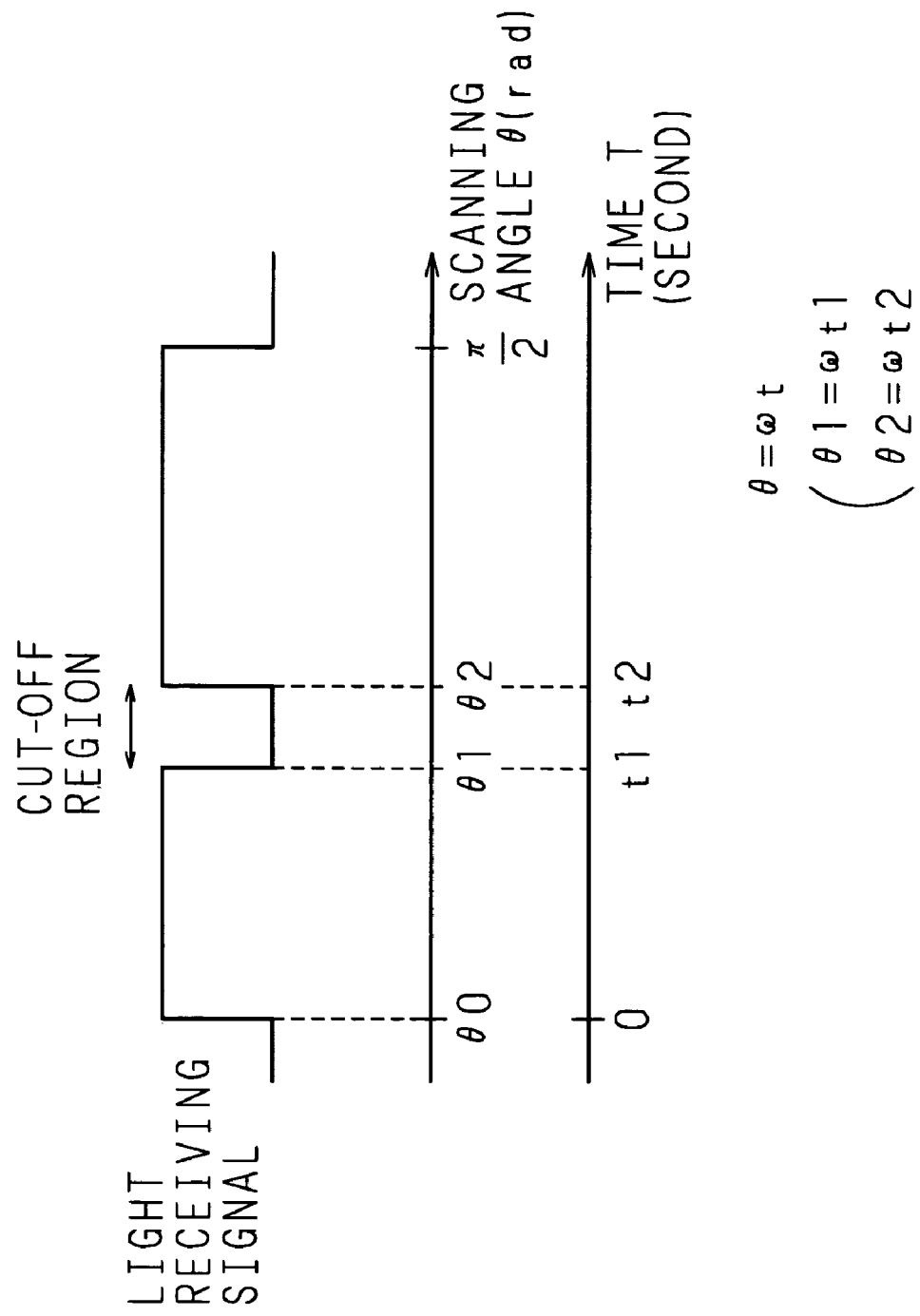
FIG. 20 is a timing chart showing the relationship between the light receiving signal and the scanning angle and scanning time.

By the way, when the scanning angular velocity of the respective polygon mirrors 14 is constant, the information about the scanning angle is obtainable by measuring the time. FIG. 20 is a timing chart showing the relationship between the light receiving signal from the light receiving signal detector 3a and the scanning angle θ and scanning time T of the polygon mirror 14 in the optical unit 1a. When the scanning angular velocity of the polygon mirror 14 is constant, if the scanning angular velocity is represented by ω, a proportional relationship as shown by equation (6) below is established between the scanning angle θ and the scanning time T.

$$\theta = \omega \times T \quad (6)$$

Therefore, the angles θ1 and θ2 at the time of the fall and rise of the light receiving signal establish the relationships shown by equations (7) and (8) below with the scanning time t1 and t2.

$$\theta 1 = \omega \times t1 \quad (7)$$

$$\theta 2 = \omega \times t2 \quad (8)$$

Thus, when the scanning angular velocity of the polygon mirrors 14 is constant, it is possible to measure the cut-off range and coordinate position of the indicator S (finger) by using the time information.

Figure 21:
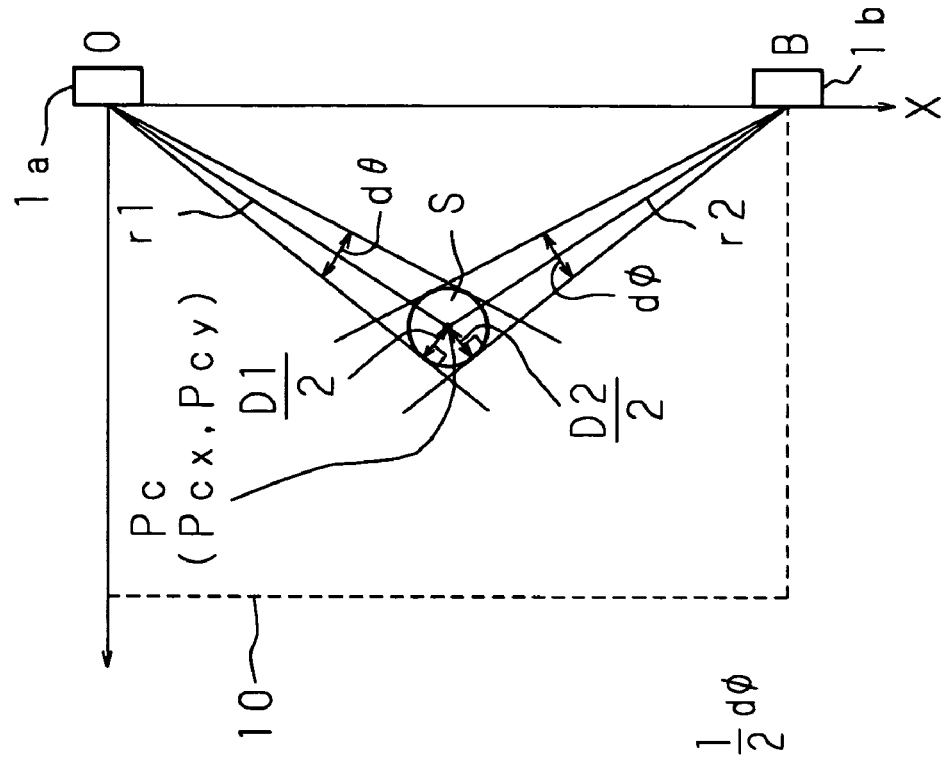
FIG. 21 is a schematic diagram showing the principle of measurement of the diameter of a cross section of the indicator.

Moreover, in the optical scanning-type touch panel of the present invention, it is possible to calculate the size (the diameter of the cross section) of the indicator S (finger) from the measured cut-off range. FIG. 21 is a schematic diagram showing the principle of measuring the diameter of the cross section of the indicator S. In FIG. 21, D1 and D2 represent diameters of cross sections of the indicator S seen from the optical units 1a and 1b, respectively. First, distances OPc (r1) and BPc (r2) from the positions O (0, 0) and B (L, 0) of the optical units 1a and 1b to the central point Pc (Pcx, Pcy) of the indicator S are calculated as shown by equations (9) and (10) below.

$$OPc = r1 = (Pcx^2 + Pcy^2)^{1/2} \quad (9)$$

$$BPc = r2 = \{(L - Pcx)^2 + Pcy^2\}^{1/2} \quad (10)$$

Since the radius of the cross section of the indicator S can be approximated by the product of the distance to the central point and sine of a half of the cut-off angle, the diameters D1 and D2 of the cross sections are measurable according to equations (11) and (12) below.

$$D1 = 2 \cdot r1 \cdot \sin(d\theta/2) \quad (11)$$
$$= 2(Pcx^2 + Pcy^2)^{1/2} \cdot \sin(d\theta/2)$$

$$D2 = 2 \cdot r2 \cdot \sin(d\phi/2) \quad (12)$$
$$= 2\{(L - Pcx)^2 + Pcy^2\}^{1/2} \cdot \sin(d\phi/2)$$

Further, when $d\theta/2$, $d\phi/2 \approx 0$, it is possible to approximate $\sin(d\theta/2) \approx d\theta/2 \approx \tan(d\theta/2)$ and $\sin(d\phi/2) \approx d\phi/2 \approx \tan(d\phi/2)$, and therefore $d\theta/2$ or $\tan(d\theta/2)$, or $d\phi/2$ or $\tan(d\phi/2)$ may be substituted for $\sin(d\theta/2)$ and $\sin(d\phi/2)$ in equations (11) and (12).

Besides, in the above example, while the aperture mirror 15 is used as the deflecting unit, any optical member having the light transmitting and light reflecting functions may be used, and, it is possible to use a half mirror, beam splitter, etc., for example.

INDUSTRIAL APPLICABILITY

As described above, in the present invention, since the shape of the deflecting unit is asymmetrical in the scanning direction and/or the vertical direction about the optical axis, it is possible to enlarge the effective light receiving area for the scanning light and improve the light receiving signal level, thereby achieving a high S/N ratio.

Moreover, since the height of the deflecting unit is arranged to be the same as the height of the optical scanning unit, it is possible to eliminate an unnecessary light receiving surface from the deflecting unit and prevent reception of disturbing light, thereby achieving a high S/N ratio.

Furthermore, since the width of the deflecting unit is arranged to be the same as the scanning surface opening width of the optical scanning unit in scanning the diagonal section within the predetermined region, it is possible to eliminate an unnecessary light receiving surface from the deflecting unit and prevent reception of disturbing light, thereby achieving a high S/N ratio.

In addition, since the optical members are positioned to satisfy the above-mentioned condition (1), it is possible to certainly scan light within the predetermined region and surely receive the reflected light.

Besides, since the optical scanning unit is provided with a protective film giving the maximum reflectance at an angle of incidence corresponding to a scanning angle at which the quantity of the reflected light is minimum, it is possible to improve the light receiving signal level in scanning a position where the quantity of the reflected light is minimum, thereby achieving a high S/N ratio.

The invention claimed is:

1. An optical scanning-type touch panel, comprising:
    an optical scanning unit for angularly scanning light in a plane substantially parallel to a predetermined region;
    a mirrored deflecting unit for deflecting scanning light of said optical scanning unit; and
    a light receiving unit for receiving the deflected scanning light, for detecting a scanning light cut-off position, which is produced in said predetermined region by an indicator, based on a light receiving output of said light receiving unit that corresponds to a scanning angle,
    wherein said deflecting unit has an asymmetrical shape about an optical axis.

2. The optical scanning-type touch panel as set forth in claim 1,
    wherein the shape of said deflecting unit is asymmetrical in a scanning direction.

3. The optical scanning-type touch panel as set forth in claim 1,
    wherein the shape of said deflecting unit is asymmetrical in a height direction.

4. The optical scanning-type touch panel as set forth in claim 3,
    wherein a height of said deflecting unit is substantially equal to a height of said optical scanning unit.

5. The optical scanning-type touch panel as set forth in claim 4,
    wherein said predetermined region has a rectangular shape, and a width of said deflecting unit is substantially equal to a scanning surface opening width of said optical scanning unit in scanning a diagonal section of said predetermined region with light.

6. An optical scanning-type touch panel, comprising:
    an optical scanning unit for angularly scanning light in a plane substantially parallel to a predetermined region;
    a deflecting unit for deflecting scanning light of said optical scanning unit; and
    a light receiving unit for receiving the deflected scanning light, for detecting a scanning light cut-off position, which is produced in said predetermined region by an indicator, based on a light receiving output of said light receiving unit that corresponds to a scanning angle,
    wherein said optical scanning-type touch panel satisfies a condition $$d/2 + w < D \tan \delta$$

where D is a distance from said optical scanning unit to said deflecting unit, w is a width on said deflecting unit from a path of said scanning light to an end on said predetermined region side, d is a beam width of said scanning light, and δ is a scanning start angle.

7. An optical scanning-type touch panel, comprising:
    an optical scanning unit for angularly scanning light in a plane substantially parallel to a predetermined region;
    a deflecting unit for deflecting scanning light of said optical scanning unit; and a light receiving unit for receiving the deflected scanning light, for detecting a scanning light cut-off position, which is produced in said predetermined region by an indicator, based on a light receiving output of said light receiving unit that corresponds to a scanning angle, wherein said deflecting unit has an asymmetrical shape about an optical axis and an asymmetrical shape in a height direction, wherein a height of said deflecting unit is substantially equal to a height of said optical scanning unit, and wherein said predetermined region has a rectangular shape, and a width of said deflecting unit is substantially equal to a scanning surface opening width of said optical scanning unit in scanning a diagonal section of said predetermined region with light.

* * * * *